Figure 1:
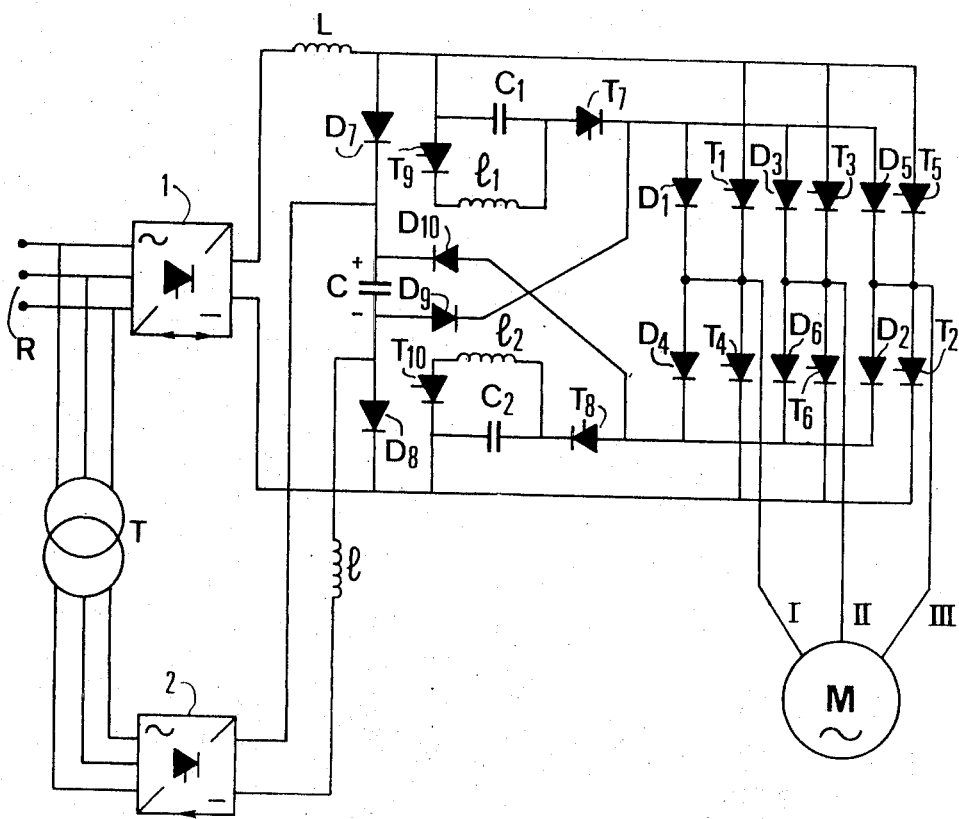

United States Patent [19]
Wiart

[11] 3,859,577
[45] Jan. 7, 1975

[54] SYSTEM FOR ADJUSTING AND COMMUTATING CURRENT IN MACHINE WINDINGS

[75] Inventor: Albert Wiart, Val D'Oise, France

[73] Assignee: Jeumont-Schneider, Paris, France

[22] Filed: July 2, 1973

[21] Appl. No.: 375,725

[30] Foreign Application Priority Data
July 3, 1972 France .............................. 72.23931

[52] U.S. Cl................. 318/138, 318/227, 318/230, 318/231
[51] Int. Cl. .......................................... H02k 29/00
[58] Field of Search ............ 318/138, 227, 230, 231

[56] References Cited
UNITED STATES PATENTS

| | | | |
|---|---|---|---|
| 3,262,036 | 7/1966 | Clarke et al. ................. | 318/227 X |
| 3,406,325 | 10/1968 | Rosa .............................. | 318/227 X |
| 3,423,662 | 1/1969 | Schlabach et al............... | 318/227 X |
| 3,525,100 | 8/1970 | Duff.................................. | 318/227 |
| 3,568,021 | 3/1971 | Turnbull .......................... | 318/227 |
| 3,639,818 | 2/1972 | Wiart............................. | 318/227 X |

*Primary Examiner*—G. Z. Rubinson

[57] ABSTRACT

A system for adjusting and selectively commutating in the windings of a polyphase ($n$ phase) electrical machine, the system being connected to an AC supply. The system is characterized in that it comprises a thyristorized reversible inverter which is connected to the power supply and which is associated with a smoothing inductance and adapted for an adjustable current on the DC side; a thyristorized 2 $n$-arm routing bridge whose $n$ center points are connected to the $n$ phase terminals respectively of the machine and in which the ends of each commutating group are connected to the output terminals of the reversible inverter which is adapted to route the adjustable DC cyclically through the $n$ phase windings of the machine; a 2 $n$-arm diode bridge whose center points are connected to the phase terminals respectively of the machine and in which the end of each commutating group is connected to a circuit for turning off the routing thyristors and to a commutating circuit introducing a voltage difference between such end and the corresponding end of the routing thyristor bridge, the commutating circuit comprising a receiver sampling the reactive commutating energy produced in the machine windings.

7 Claims, 2 Drawing Figures

3,859,577

SYSTEM FOR ADJUSTING AND COMMUTATING CURRENT IN MACHINE WINDINGS

This invention relates to a system for adjusting and selectively commutating current in the windings of a single-phase or polyphase AC machine, more particularly of an asynchronous squirrel-cage motor, the system being connected across an AC supply used to produce an adjustable DC which is consecutively routed in repetitive cycles to the different motor phases so as to energize the motor at a variable frequency and voltage and to control the motor speed.

Known systems which control the speed of machines of this kind from an AC supply usually comprise a rectifying circuit, an intermediate DC circuit and an inverter. The same is usually embodied as a thyristorized three-phase bridge arrangement. The inputs to the thyristors determine the inverter output voltage frequency and therefore the motor speed.

In all operating conditions the stator current of an asynchronous machine comprises a large inductive component because of the magnetizing current and of stray reactances. The inverter must therefore be associated with by-pass diodes through which the machine current can flow when any thyristor is turned off. Unlike synchronous machines, asynchronous machines cannot supply a commutating voltage to the inverter supplying them. The commutating voltage must be supplied by the inverter itself, and therefor a special switching arrangement is needed to switch the motor current from any thyristor to a by-pass or discharge diode.

Other known systems use an intermediate circuit based not on a DC voltage but on a constant DC current. The advantage of these systems is that they produce across the machine a voltage whose shape is independent of the shape of the voltage in the intermediate circuit. The current remains constant during switching. The machine can operate both as a motor and as a regenerating generator.

The system according to the invention is a means of applying approximately sinusoidal voltages to the machine — i.e., operating conditions are optimum. Another advantage of the system according to the invention is to provide a machine with a regenerative braking feature.

The system according to the invention for adjusting and selectively commutating current in the windings of a polyphase ($n$ phases) electrical machine, the system being connected to an AC supply, is characterized in that the system comprises:

a thyristorized reversible inverter which is connected to the power supply and which is associated with a smoothing inductance and which is adapted for an adjustable current on the DC side;

a thyristorized 2 $n$-arm routing bridge whose $n$ center points are connected to the $n$ phase terminals respectively of the machine and in which the end of each commutating group is connected to the output terminals of the reversible inverter which is adapted to route the adjustable DC cyclically through the $n$ phase windings of the machine;

a 2 $n$-arm diode bridge whose $n$ center points are connected to the phase terminals respectively of the machine and in which the end of each commutating group is connected to a circuit for turning off the routing thyristors and to a commutating circuit introducing a voltage difference between such end and the corresponding end of the routing thyristor bridge, the commutating circuit comprising a receiver sampling the reactive commutating energy produced in the machine windings.

Figure 2:
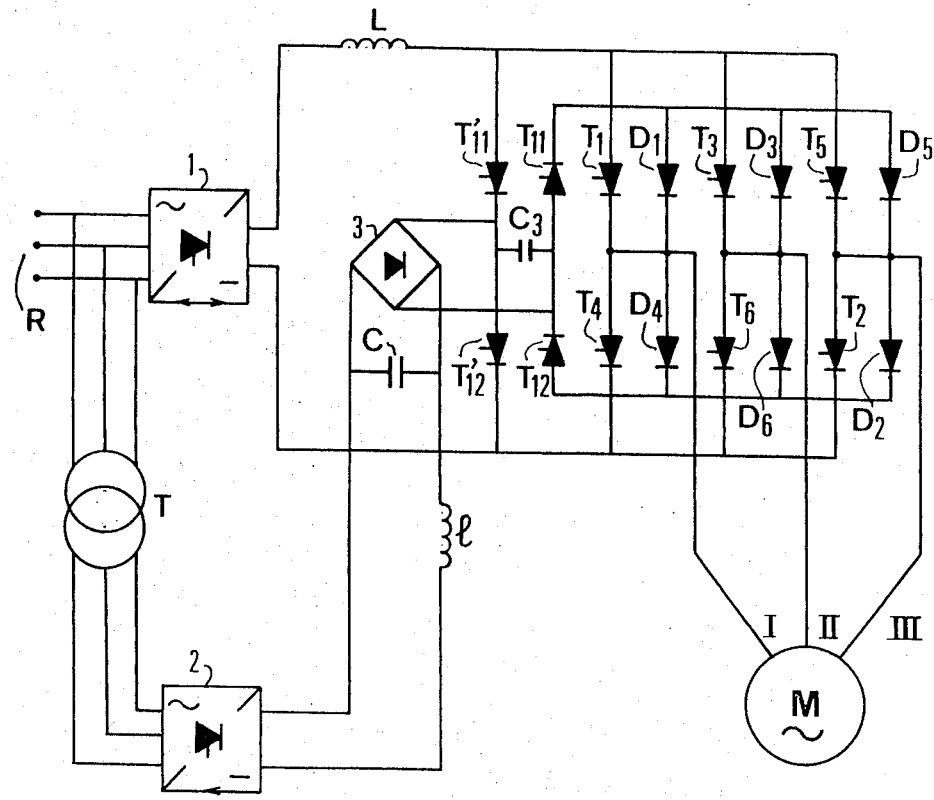

The invention will be more clearly undestood with reference to an embodiment and to the accompanying drawings wherein:

FIG. 1 shows a system comprising two different circuits for turning off the routing transistors, and a receiver common to the two commutating circuits and FIG. 2 shows a variant wherein the thyristor turn off circuits have a common capacitor.

Referring to FIG. 1, the system according to the invention is connected to a three-phase AC supply R. A reversible inverter 1 is connected to supply R and is associated on the DC side with a smoothing inductance L. The inverter can provide an adjustable DC.

A bridge of thyristors, called routing thyristors, comprising six arms $T_1$, $T_3$, $T_5$, $T_4$, $T_6$, and $T_2$, has its three center points connected to phase terminals I, II, III respectively of a three-phase motor M and has the ends of its two commutating groups ($T_1$, $T_3$, $T_5$ and $T_2$, $T_4$, $T_6$) connected to the DC terminals, respectively, of inverter 1. The routing bridge has a known logical control unit providing cyclic routing of the adjustable DC through the three-phase windings of motor M. A diode bridge having 6 arms $D_1$, $D_3$, $D_5$, $D_2$, $D_4$, $D_6$ is arranged in the same way as the thyristor bridge, and the three center points of the diode bridge are connected to the motor terminals I, II, III respectively.

Connected between the end of the first group $T_1$, $T_3$, $T_5$ — i.e., the thyristor anodes — and the end of the corresponding first group of diodes $D_1$, $D_3$, $D_5$ — i.e., the diode anodes — is a turn-off circuit for thyristors $T_1$, $T_3$, $T_5$, such circuit comprising a capacitor $C_1$ in series with a turn-off thyristor $T_7$. Connected across capacitor $C_1$ is a charge-reversing circuit in the form of a thyristor $T_9$ in series with an inductance $l_1$.

Connected between the ends of the commutating groups just mentioned is a transitional commutating circuit comprising in series a diode $D_7$, a capacitor C and a diode $D_9$, the diodes $D_7$ and $D_9$ being oriented in the same way as $T_7$.

Connected between the end of the second commutating group $T_2$, $T_4$, $T_6$ — i.e., the cathodes of these thyristors — and the end of the corresponding second group of diodes $D_2$, $D_4$, $D_6$ — i.e., the diode cathodes — is a circuit which is adapted to turn off the thyristors $T_2$, $T_4$, $T_6$ and which is similar to the turn-off circuit just described and which comprises a capacitor $C_2$ in series with a turn-off thyristor $T_8$. Connected across capacitor $C_2$ is a charge-reversing circuit which is similar to the charge-reversing circuit previously described and which comprises a thyristor $T_{10}$ and an inductance $l_2$. Also, connected between, on the one hand, the cathodes of diodes $D_2$, $D_4$, $D_6$ and, on the other hand, the cathodes of thyristors $T_2$, $T_4$, $T_6$ is a commutating circuit comprising in series a diode $D_{10}$, the capacitor C (which is common to the two commutating circuits mentioned and a diode $D_8$.

If a capacitor such as C is used for each commutating circuit, only a single diode is needed in each such circuit.

The commutating capacitor C which is common to the two circuits acts as a receiver which samples the reactive commutating energy produced in the motor windings during the phase-to-phase commutating triggered by the routing thyristors.

In the case of FIG. 1 such energy is returned to the supply R via an inverter 2 associated with a smoothing inductance 1 and via a voltage-matching transformer T. This energy could of course be used in any other way; however, the transformer T is a means of providing a separation of potential and of determining the nominal voltage of the capacitor C.

In detail, the system shown in FIG. 1 operates as follows:

It will be assumed that at a particular time motor terminal I is energized through thyristor $T_i$ and it is required to route the load to terminal II. First, $T_1$ is turned off by turning on thyristor $T_7$. Capacitor $C_1$, being charged to its nominal value (positive polarity on its right-hand side), discharges via diode $D_1$ whose potential is therefore appreciably above the potential of the cathode of thyristor $T_1$. $T_3$ is then turned on. Capacitor $C_1$ is discharged and so its polarity reverses; a decreasing current flows via $D_7$, C, $D_9$, $D_1$, and an increasing current flows through thyristor $T_3$, until the completion of commutation. Thyristor $T_9$ is then turned off and reverses the charge of capacitor $C_1$ to return the charge to the initial state, whereafter the cycle can recommence for another commutation operation.

Consequently, for each commutating group of the thyristor bridge, commutation of the current from any motor terminal to the other is the result of voltage differences between the end of the commutating group concerned and the end of the corresponding group of the diode bridge. During the actual commutating time the total current distributed consecutively to the motor phases has been maintained constant.

Since the diagram is symmetrical, the commutations of the other commutating thyristor group $T_4$, $T_6$, $T_2$ with the corresponding symmetrical circuits are just the same.

Throughout each commutating operation, therefore, a charging current flows through the capacitor C, and the same should be discharged so as to remain at its nominal voltage. The discharge is provided and adjusted by means of the thyristorized inverter 2 which returns power to the supply R.

The system according to the invention enables the motor to regenerate to the supply R. When the motor is generating, for instance, for braking, the current tends to rise; to maintain the current, therefore, the phase shift of the reversible inverter 1 is increased to start it operating as an inverter so that power can be returned to the supply R.

FIG. 2 shows a system of the same kind as in FIG. 1 except that the thyristor turn-off circuits are different; like elements have like references in FIGS. 1 and 2. The capacitors $C_1$, $C_2$ of FIG. 1 are replaced by a single capacitor $C_3$; there is therefore a first turn-off circuit, in the form of a first thyristor $T'_{11}$ in series with $C_3$ and with a second thyristor $T_{11}$, the two thyristors being connected on either side of $C_3$. The second turn-off circuit is symmetrical of the first and comprises two more thyristors $T_{12}$ and $T'_{12}$.

If it is required to turn off $T_1$ to make $T_3$ conductive, as in FIG. 1, the thyristors $T_{11}$, $T'_{11}$ are turned on and capacitor $C_3$ discharges via diode $D_1$ to turn off thyristor $T_1$. Thyristor $T_3$ is then turned-on the polarity of capacitor $C_3$ is reversed, but unlike what happens in FIG. 1, where there is a capacitor for each direction of current, the capacitor $C_3$ has exactly the required polarity for making the next switchover to the other group of thyristors $T_2$, $T_4$, $T_6$ by means of the thyristors $T_{12}$ and $T'_{12}$.

When the charge of $C_3$ reverse during a commutating operation and the voltage $C_3$ reaches its nominal value, the commutating current is routed via the rectifying bridge 3, to the commutating capacitor C; the same is charged and, as in the case of FIG. 1, its charge is adjusted by means of the inverter 2.

The capacitors $C_1$, $C_2$ (FIG. 1) and $C_3$ (FIG. 2) must have a fairly short discharge time so as not to delay the commutation of the routing thyristors $T_1$ to $T_6$.

The invention is of use more particularly for speed control devices of the kind used in industry and for traction motors.

I claim:

1. A circuit for commutating current in the windings of an $n$-phase electrical machine wherein an AC supply is connected to a reversible inverter having DC output connections, said circuit comprising:
   a. inductor means having one end connected to one DC output connection of said reversible inverter for adjusting and smoothing the current of said one DC output connnection during commutating and non-commutating operations.
   b. a 2 $n$-arm thyristorized routing bridge having an input and an output side with $n$ center points, said $n$ center points connected to the $n$ phase electrical machine, one side of said routing bridge connected to said inductor means, the other side of said routing bridge connected to the other DC output connection of said reversible inverter,
   c. a 2 $n$-arm diode bridge having an input and an output side with n center points, said $n$ center points connected to the $n$-phase electrical machine,
   d. turn-off circuit means connected between each side of said diode bridge and a corresponding side of said routing bridge for establishing a voltage difference between corresponding sides of said diode and said routing bridges for turning off the routing thyristors of said routing bridge, and
   e. transitional-commutating circuit means connected between each side of said diode bridge and the corresponding side of said routing bridge for sampling the reactive commutating energy produced in said machine windings, said transitional-commutating circuit means and said inductor means connected in a series current path between said supply and said machine windings during commutation.

2. A circuit according to claim 1 wherein said transitional-commutating circuit means includes a single means, common to two individual transitional-commutating circuits associated respectively with each side of said diode bridge circuit and said routing bridge circuit, said single means sampling the reactive commutating energy produced in the machine windings.

3. A circuit according to claim 2 wherein said single means is a capacitor, one side of the capacitor connected to a second inductor means the other side of said capacitor and the other side of said second inductor means respectively connected to the input connections of an inverter, the output connection of said inverter connected to the AC supply through a voltage-matching transformer.

4. A circuit according to claim 2 wherein each individual transitional-commutating circuit comprises at least one diode in series with said single means.

5. A circuit according to claim 1 wherein said circuit means for turning off the routing thyristors of said routing bridge comprises a capacitor in series with a thyristor for each side of said diode bridge and said routing bridge, each of said capacitors being associated with a charge-reversing circuit, each charge-reversing circuit comprising a thyristor and an inductance.

6. A circuit according to claim 1 wherein said circuit means for turning off the routing thyristors of said routing bridge comprises a common turn-off capacitor and thyristor means, and wherein for each side of said diode bridge and said routing bridge said thyristor means comprises two thyristors.

7. A circuit according to claim 6 wherein a single means for sampling the reactive commutating energy produced in the machine windings is connected across said common turn-off capacitor.

* * * * *